US008664844B2

(12) United States Patent
Miyashita et al.

(10) Patent No.: US 8,664,844 B2
(45) Date of Patent: Mar. 4, 2014

(54) SPARK PLUG HAVING A SUBSTANTIALLY COLUMNAR ELECTRODE TIP WELDED TO A COMPONENT THEREOF

(75) Inventors: Naomichi Miyashita, Aichi (JP); Mamoru Musasa, Hurricane, WV (US)

(73) Assignee: NGK Spark Plug., Ltd., Aichi (JP)

( * ) Notice: Subject to any disclaimer, the term of this patent is extended or adjusted under 35 U.S.C. 154(b) by 217 days.

(21) Appl. No.: 13/320,552

(22) PCT Filed: Apr. 5, 2010

(86) PCT No.: PCT/JP2010/002467

§ 371 (c)(1), (2), (4) Date: Nov. 15, 2011

(87) PCT Pub. No.: WO2010/134254

PCT Pub. Date: Nov. 25, 2010

(65) Prior Publication Data

US 2012/0062099 A1 Mar. 15, 2012

(30) Foreign Application Priority Data

May 19, 2009 (JP) ................................ 2009-120480

(51) Int. Cl.
*H01T 13/32* (2006.01)

(52) U.S. Cl.
USPC .......................................... 313/144; 313/141

(58) Field of Classification Search
None
See application file for complete search history.

(56) References Cited

U.S. PATENT DOCUMENTS

| | | | | |
|---|---|---|---|---|
| 8,106,572 | B2 * | 1/2012 | Tanaka et al. | 313/141 |
| 2002/0105254 | A1 * | 8/2002 | Hori et al. | 313/141 |
| 2004/0189169 | A1 * | 9/2004 | Taniguchi et al. | 313/141 |
| 2009/0140625 | A1 * | 6/2009 | Kato | 313/141 |
| 2010/0109502 | A1 | 5/2010 | Nakayama et al. | 313/141 |
| 2010/0264801 | A1 * | 10/2010 | Tanaka et al. | 313/141 |
| 2010/0264802 | A1 * | 10/2010 | Tanaka et al. | 313/141 |
| 2012/0217864 | A1 * | 8/2012 | Sumoyama et al. | 313/141 |

FOREIGN PATENT DOCUMENTS

| | | | |
|---|---|---|---|
| JP | 58-61981 | 4/1983 | B23K 15/00 |
| JP | 2-127986 | 5/1990 | B23K 15/00 |
| JP | 7-286528 | 10/1995 | F02B 39/00 |
| JP | 2005-203110 | 7/2005 | H01T 13/20 |
| JP | 2006-32185 | 2/2006 | H01T 13/39 |
| JP | 2008-270189 | 11/2008 | H01T 13/20 |

OTHER PUBLICATIONS

International Search Report for International Application No. PCT/JP2010/002467, Aug. 3, 2010.

* cited by examiner

*Primary Examiner* — Britt D Hanley
(74) *Attorney, Agent, or Firm* — Kesner & Jaffe

(57) ABSTRACT

An object of the invention is to restrain separation of an electrode tip from a ground electrode or from a center electrode. A spark plug satisfies a condition $0.8 \leq A1/A2 \leq 1.9$, where, as viewed on a section which contains a center axis (O) of an electrode tip, A1 [Hv] is hardness of the electrode tip as measured outside a circle having a radius of 0.2 mm, with a boundary point (PA) on a surface of the spark plug between a fusion zone and the electrode tip serving as the center of the circle, and A2 [Hv] is hardness of the electrode tip as measured within the circle having a radius of 0.2 mm.

25 Claims, 11 Drawing Sheets

| | Radius of imaginary circle | Hardness at measuring point [Hv] | Ratio of hardness to that at measuring point E |
|---|---|---|---|
| E | - | 315 | - |
| A | 0.1 | 280 | 0.89 |
| B | 0.2 | 286 | 0.91 |
| C | 0.3 | 315 | 1.00 |
| D | 0.4 | 315 | 1.00 |

FIG. 15

| | Type | Linear expansion coefficient ($\times 10^{-6}$) | | A1 | A2 | B1 | B2 | A1/A2 | B2/B1 | Judgment on separation |
|---|---|---|---|---|---|---|---|---|---|---|
| | | Material of tip | Base metal 1 | | | | | | | |
| Sample 1 | 1st embodiment D = 0.6 | 10.0 @ 1,000°C Pt-Ir alloy | 17.8 @1,000°C INCONEL 601 | 317 | 408 | 141 | 92 | 0.78 | 0.65 | Failure |
| Sample 2 | | | | 316 | 395 | 142 | 99 | 0.80 | 0.70 | Good |
| Sample 3 | | | | 317 | 297 | 145 | 215 | 1.07 | 1.48 | Good |
| Sample 4 | | | | 315 | 207 | 139 | 326 | 1.52 | 2.35 | Good |
| Sample 5 | | | | 320 | 168 | 135 | 338 | 1.90 | 2.50 | Good |
| Sample 6 | | | | 313 | 153 | 138 | 361 | 2.05 | 2.62 | Failure |
| Sample 7 | 2nd embodiment D = 0.6 | 13.4 @ 1,000°C Pt-Ni alloy 1 | 17.8 @ 1,000°C INCONEL 601 | 343 | 439 | 175 | 109 | 0.78 | 0.62 | Failure |
| Sample 8 | | | | 345 | 433 | 172 | 119 | 0.80 | 0.69 | Good |
| Sample 9 | | | | 349 | 390 | 176 | 140 | 0.89 | 0.80 | Good |
| Sample 10 | | | | 339 | 247 | 176 | 254 | 1.37 | 1.44 | Good |
| Sample 11 | | | | 343 | 179 | 168 | 421 | 1.92 | 2.51 | Good |
| Sample 12 | | | | 343 | 162 | 168 | 435 | 2.12 | 2.59 | Failure |
| Sample 13 | 3rd embodiment D = 0.6 | 15.0 @ 1,000°C Pt-Ni alloy 2 | 17.8 @ 1,000°C INCONEL 601 | 448 | 566 | 362 | 164 | 0.79 | 0.45 | Failure |
| Sample 14 | | | | 452 | 548 | 355 | 177 | 0.82 | 0.50 | Good |
| Sample 15 | | | | 453 | 506 | 365 | 193 | 0.90 | 0.53 | Good |
| Sample 16 | | | | 445 | 558 | 173 | 289 | 0.80 | 1.67 | Good |
| Sample 17 | | | | 458 | 387 | 175 | 373 | 1.18 | 2.13 | Good |
| Sample 18 | | | | 449 | 235 | 174 | 435 | 1.91 | 2.50 | Good |
| Sample 19 | | | | 455 | 218 | 171 | 442 | 2.09 | 2.58 | Failure |

FIG. 16

| | Type | Linear expansion coefficient ($\times 10^{-6}$) | | A1 | A2 | B1 | B2 | A1/A2 | B2/B1 | Judgment on separation |
|---|---|---|---|---|---|---|---|---|---|---|
| | | Material of tip | Base metal | | | | | | | |
| Sample 20 | 4th embodiment D = 0.6 θ = 50° | 8.9 @ 1,000°C Ir-Pt alloy | 16.4 @ 1,000°C INCONEL 600 | 665 | 521 | 275 | 174 | 0.78 | 0.63 | Failure |
| Sample 21 | | | | 680 | 543 | 273 | 191 | 0.80 | 0.70 | Good |
| Sample 22 | | | | 649 | 531 | 272 | 353 | 0.82 | 1.30 | Good |
| Sample 23 | | | | 524 | 529 | 270 | 463 | 1.01 | 1.71 | Good |
| Sample 24 | | | | 406 | 549 | 275 | 557 | 1.35 | 2.03 | Good |
| Sample 25 | | | | 282 | 537 | 273 | 632 | 1.90 | 2.32 | Good |
| Sample 26 | | | | 261 | 543 | 281 | 702 | 2.08 | 2.50 | Failure |
| Sample 27 | 5th embodiment D = 0.6 θ = 88° | 8.9 @ 1,000°C Ir-Pt alloy | 16.4 @ 1,000°C INCONEL 600 | 665 | 518 | 321 | 154 | 0.78 | 0.48 | Failure |
| Sample 28 | | | | 670 | 536 | 316 | 221 | 0.80 | 0.70 | Good |
| Sample 29 | | | | 535 | 531 | 323 | 347 | 0.99 | 1.07 | Good |
| Sample 30 | | | | 526 | 538 | 168 | 343 | 1.02 | 2.04 | Good |
| Sample 31 | | | | 396 | 551 | 160 | 345 | 1.39 | 2.16 | Good |
| Sample 32 | | | | 274 | 524 | 161 | 375 | 1.91 | 2.33 | Good |
| Sample 33 | | | | 258 | 563 | 163 | 702 | 2.18 | 4.31 | Failure |

$$\text{SEPARATION RATE (\%)} = \frac{T1+T2}{S1+S2} \times 100$$

FIG. 19

| θ | B1 | B2 | B2/B1 | Judgment on separation |
|---|---|---|---|---|
| 43 | 174 | 116 | 0.67 | Failure |
| 60 | 174 | 121 | 0.70 | Good |
| 72 | 177 | 182 | 1.03 | Good |
| 93 | 176 | 254 | 1.44 | Good |
| 145 | 173 | 316 | 1.83 | Good |
| 150 | 174 | 437 | 2.51 | Good |
| 163 | 176 | 452 | 2.57 | Failure |

FIG. 20

| θ | B1 | B2 | B2/B1 | Judgment on separation |
|---|---|---|---|---|
| 28 | 165 | 102 | 0.62 | Failure |
| 30 | 163 | 114 | 0.70 | Good |
| 42 | 164 | 176 | 1.07 | Good |
| 70 | 165 | 247 | 1.50 | Good |
| 83 | 162 | 347 | 2.14 | Good |
| 90 | 166 | 382 | 2.30 | Good |
| 127 | 162 | 402 | 2.48 | Failure |

SPARK PLUG HAVING A SUBSTANTIALLY COLUMNAR ELECTRODE TIP WELDED TO A COMPONENT THEREOF

FIELD OF THE INVENTION

The present invention relates to a spark plug having electrode tips.

BACKGROUND OF THE INVENTION

Conventionally, in order to improve erosion resistance of an electrode portion of a spark plug, an electrode tip formed from a noble metal, such as platinum, iridium, ruthenium, or rhodium, or from a noble metal alloy is provided on a distal end portion of a ground electrode and on a front end portion of a center electrode (see Japanese Patent Application Laid-Open (kokai) No. 2006-32185, hereinafter referred to as Patent Document 1). Such electrode tips are usually laser-welded to the center electrode and to the ground electrode.

Generally, metals used to form the center electrode and the ground electrode differ from those used to form the electrode tips. Accordingly, the center electrode and the ground electrode differ in thermal expansion coefficient from the electrode tips. Thus, in a certain welded condition in which the electrode tip is welded to the center electrode or to the ground electrode, the electrode tip may separate from the center electrode or from the ground electrode, for example, in a heat load test in which heating and cooling are repeated, or in the course of operation of an internal combustion engine.

SUMMARY OF THE INVENTION

Problems to be Solved by the Invention

In view of the above problem, an object of the present invention is to restrain separation of an electrode tip from a ground electrode or from a center electrode.

Means for Solving the Problems

The present invention has been conceived for solving, at least partially, the above problem and can be embodied in the following modes or application examples.

APPLICATION EXAMPLE 1

A spark plug in which a substantially columnar electrode tip is welded to a distal end portion of a ground electrode, and a fusion zone is formed through the welding at a boundary portion between the ground electrode and the electrode tip, the spark plug satisfying a condition $0.8 \leq A1/A2 \leq 1.9$, where, as viewed on a section which contains a center axis of the electrode tip, A1 [Hv] is hardness of the electrode tip as measured outside a circle having a radius of 0.2 mm, with a boundary point on a surface of the spark plug between the fusion zone and the electrode tip serving as the center of the circle, and A2 [Hv] is hardness of the electrode tip as measured within the circle having a radius of 0.2 mm.

APPLICATION EXAMPLE 2

A spark plug according to application example 1, satisfying a condition $0.7 \leq B2/B1 \leq 2.5$, where, as viewed on the section, B1 is hardness [Hv] of the ground electrode as measured outside a circle having a radius of 0.2 mm, with a boundary point on a surface of the spark plug between the fusion zone and the ground electrode serving as the center of the circle, and B2 is hardness [Hv] of the ground electrode as measured within the circle having a radius of 0.2 mm.

APPLICATION EXAMPLE 3

A spark plug according to application example 1 or 2, wherein the ground electrode has a pedestal portion protruding from a distal end portion thereof, and the electrode tip is placed on the pedestal portion and is joined to the pedestal portion by means of a boundary portion between the pedestal portion and the electrode tip being subjected to welding.

APPLICATION EXAMPLE 4

A spark plug according to any one of application examples 1 to 3, wherein the ground electrode has a linear expansion coefficient greater than that of the electrode tip.

APPLICATION EXAMPLE 5

A spark plug in which a substantially columnar electrode tip is welded to a top surface of a convex intermediate tip having a flange portion at a bottom thereof to thereby form a composite tip having a fusion zone formed through the welding at a boundary portion between the intermediate tip and the electrode tip, and the composite tip is joined to a distal end portion of the ground electrode via the flange portion, the spark plug satisfying a condition $0.8 \leq A1/A2 \leq 1.9$, where, as viewed on a section which contains a center axis of the electrode tip, A1 [Hv] is hardness of the electrode tip as measured outside a circle having a radius of 0.2 mm, with a boundary point on a surface of the spark plug between the fusion zone and the electrode tip serving as the center of the circle, and A2 [Hv] is hardness of the electrode tip as measured within the circle having a radius of 0.2 mm.

APPLICATION EXAMPLE 6

A spark plug according to application example 5, satisfying a condition $0.5 \leq B2/B1 \leq 2.5$, where, as viewed on the section, B1 is hardness [Hv] of the ground electrode as measured outside a circle having a radius of 0.2 mm, with a boundary point on a surface of the spark plug between the fusion zone and the intermediate tip serving as the center of the circle, and B2 is hardness [Hv] of the intermediate tip as measured within the circle having a radius of 0.2 mm.

APPLICATION EXAMPLE 7

A spark plug according to application example 5 or 6, wherein the intermediate tip has a linear expansion coefficient greater than that of the electrode tip.

APPLICATION EXAMPLE 8

A spark plug according to any one of application examples 1 to 7, satisfying a condition $60° \leq \theta \leq 150°$, where, as viewed on a section which contains the center axis of the electrode tip and provides a maximum width of the fusion zone as measured along the center axis, θ is an angle between the center axis and a perpendicular bisector of a line segment connecting an upper end and a lower end of the fusion zone on a surface of the spark plug.

APPLICATION EXAMPLE 9

A spark plug in which a substantially columnar electrode tip is welded to a front end portion of a center electrode, and a fusion zone is formed through the welding at a boundary portion between the center electrode and the electrode tip, the spark plug satisfying a condition $0.8 \leq A1/A2 \leq 1.9$, where, as viewed on a section which contains a center axis of the electrode tip, A1 [Hv] is hardness of the electrode tip as measured outside a circle having a radius of 0.2 mm, with a boundary point on a surface of the spark plug between the fusion zone and the electrode tip serving as the center of the circle, and A2 [Hv] is hardness of the electrode tip as measured within the circle having a radius of 0.2 mm.

APPLICATION EXAMPLE 10

A spark plug according to application example 9, satisfying a condition $0.7\ B2/B1 \leq 2.3$, where, as viewed on the section, B1 is hardness [Hv] of the center electrode as measured outside a circle having a radius of 0.2 mm, with a boundary point on a surface of the spark plug between the fusion zone and the center electrode serving as the center of the circle, and B2 is hardness [Hv] of the center electrode as measured within the circle having a radius of 0.2 mm.

APPLICATION EXAMPLE 11

A spark plug according to application example 9 or 10, wherein the center electrode has a linear expansion coefficient greater than that of the electrode tip.

APPLICATION EXAMPLE 12

A spark plug in which a substantially columnar electrode tip is welded to a top surface of a convex intermediate tip having a flange portion at a bottom thereof to thereby form a composite tip having a fusion zone formed through the welding at a boundary portion between the intermediate tip and the electrode tip, and the composite tip is joined to a front end portion of the center electrode via the flange portion, the spark plug satisfying a condition $0.8 \leq A1/A2 \leq 1.9$, where, as viewed on a section which contains a center axis of the electrode tip, A1 [Hv] is hardness of the electrode tip as measured outside a circle having a radius of 0.2 mm, with a boundary point on a surface of the spark plug between the fusion zone and the electrode tip serving as the center of the circle, and A2 [Hv] is hardness of the electrode tip as measured within the circle having a radius of 0.2 mm.

APPLICATION EXAMPLE 13

A spark plug according to application example 12, satisfying a condition $0.7 \leq B2/B1 \leq 2.3$, where, as viewed on the section, B1 is hardness [Hv] of the center electrode as measured outside a circle having a radius of 0.2 mm, with a boundary point on a surface of the spark plug between the fusion zone and the intermediate tip serving as the center of the circle, and B2 is hardness [Hv] of the intermediate tip as measured within the circle having a radius of 0.2 mm.

APPLICATION EXAMPLE 14

A spark plug according to application example 12 or 13, wherein the intermediate tip has a linear expansion coefficient greater than that of the electrode tip.

APPLICATION EXAMPLE 15

A spark plug according to any one of application examples 9 to 14, satisfying a condition $30° \leq \theta \leq 90°$, where, as viewed on a section which contains the center axis of the electrode tip and provides a maximum width of the fusion zone as measured along the center axis, $\theta$ is an angle between the center axis and a perpendicular bisector of a line segment connecting an upper end and a lower end of the fusion zone on a surface of the spark plug.

APPLICATION EXAMPLE 16

A spark plug according to any one of application examples 1 to 15, wherein the electrode tip has a width D measured along a direction perpendicular to the center axis of the electrode tip and satisfying a condition 0.4 D (mm) 1.2

APPLICATION EXAMPLE 17

A spark plug according to any one of application examples 1 to 16, wherein the electrode tip is a member which contains at least one of platinum, iridium, ruthenium, and rhodium.

Effects of the Invention

According to the spark plug of application example 1, in a structure in which the electrode tip is joined directly to the ground electrode, a preferred relation can be established between hardness A2 of the electrode tip as measured at a portion located in the vicinity of the boundary between the fusion zone and the electrode tip and influenced by welding heat, and hardness A1 of the electrode tip as measured at a portion not influenced by welding. Thus, there can be restrained separation, caused by thermal stress, of the electrode tip welded to the ground electrode at a boundary portion between the electrode tip and the fusion zone.

According to the spark plug of application example 2, in a structure in which the electrode tip is joined directly to the ground electrode, a preferred relation can be established between hardness B2 of the ground electrode as measured at a portion located in the vicinity of the boundary between the fusion zone and the ground electrode and influenced by welding heat, and hardness B1 of the ground electrode as measured at a portion not influenced by welding. Thus, there can be restrained separation, caused by thermal stress, of the electrode tip together with the fusion zone from the ground electrode.

According to the spark plug of application example 3, in a structure in which the electrode tip is joined to a pedestal portion protruding from a distal end portion of the ground electrode, separation of the electrode tip from the pedestal portion can be restrained.

According to the spark plug of application example 4, even in the case where the linear expansion coefficient of the ground electrode is greater than that of the electrode tip, separation of the electrode tip caused by thermal stress can be restrained through satisfaction of the above-mentioned hardness conditions.

According to the spark plug of application example 5, in a structure in which the electrode tip is joined to the ground electrode via the intermediate tip, a preferred relation can be established between hardness A2 of the electrode tip as measured at a portion located in the vicinity of the boundary between the fusion zone and the electrode tip and influenced by welding heat, and hardness A1 of the electrode tip as measured at a portion not influenced by welding. Thus, there can be restrained separation, caused by thermal stress, of the electrode tip welded to the intermediate tip at a boundary portion between the electrode tip and the fusion zone.

According to the spark plug of application example 6, in a structure in which the electrode tip is joined to the ground electrode via the intermediate tip, a preferred relation can be established between hardness B2 of the intermediate tip as measured at a portion located in the vicinity of the boundary between the fusion zone and the intermediate tip and influenced by welding heat, and hardness B1 of the ground electrode as measured at a portion not influenced by welding. Thus, there can be restrained separation, caused by thermal stress, of the electrode tip together with the fusion zone from the intermediate tip.

According to the spark plug of application example 7, even in the case where the linear expansion coefficient of the intermediate tip is greater than that of the electrode tip, separation of the electrode tip caused by thermal stress can be restrained through satisfaction of the above-mentioned hardness conditions.

According to the spark plug of application example 8, since the electrode tip can be welded to the ground electrode at a preferred welding angle, an increase in stress caused by thermal deformation can be restrained. Thus, separation of the electrode tip can be restrained more effectively.

According to the spark plug of application example 9, in a structure in which the electrode tip is joined directly to the center electrode, a preferred relation can be established between hardness A2 of the electrode tip as measured at a portion located in the vicinity of the boundary between the fusion zone and the electrode tip and influenced by welding heat, and hardness A1 of the electrode tip as measured at a portion not influenced by welding. Thus, there can be restrained separation, caused by thermal stress, of the electrode tip welded to a front end portion of the center electrode at a boundary portion between the electrode tip and the fusion zone.

According to the spark plug of application example 10, in a structure in which the electrode tip is joined directly to the center electrode, a preferred relation can be established between hardness B2 of the center electrode as measured at a portion located in the vicinity of the boundary between the fusion zone and the center electrode and influenced by welding heat, and hardness B1 of the center electrode as measured at a portion not influenced by welding. Thus, there can be restrained separation, caused by thermal stress, of the electrode tip together with the fusion zone from the center electrode.

According to the spark plug of application example 11, even in the case where the linear expansion coefficient of the center electrode is greater than that of the electrode tip, separation of the electrode tip caused by thermal stress can be restrained through satisfaction of the above-mentioned hardness conditions.

According to the spark plug of application example 12, in a structure in which the electrode tip is joined to the center electrode via the intermediate tip, a preferred relation can be established between hardness A2 of the electrode tip as measured at a portion located in the vicinity of the boundary between the fusion zone and the electrode tip and influenced by welding heat, and hardness A1 of the electrode tip as measured at a portion not influenced by welding. Thus, there can be restrained separation, caused by thermal stress, of the electrode tip welded to a front end portion of the center electrode via the intermediate tip at a boundary portion between the electrode tip and the fusion zone.

According to the spark plug of application example 13, in a structure in which the electrode tip is joined to the center electrode via the intermediate tip, a preferred relation can be established between hardness B2 of the intermediate tip as measured at a portion located in the vicinity of the boundary between the fusion zone and the intermediate tip and influenced by welding heat, and hardness B1 of the center electrode as measured at a portion not influenced by welding. Thus, there can be restrained separation, caused by thermal stress, of the electrode tip together with the fusion zone from the intermediate tip.

According to the spark plug of application example 14, even in the case where the linear expansion coefficient of the intermediate tip is greater than that of the electrode tip, separation of the electrode tip caused by thermal stress can be restrained through satisfaction of the above-mentioned hardness conditions.

According to the spark plug of application example 15, since the electrode tip can be welded to a front end portion of the center electrode at a preferred welding angle, an increase in stress caused by thermal deformation can be restrained. Thus, separation of the electrode tip can be restrained more effectively.

According to the spark plug of application example 16, the width of the electrode tip required for laser welding can be ensured, and the effect of restraining separation through satisfaction of the above-mentioned hardness conditions and angle conditions can be favorably yielded.

According to the spark plug of application example 17, erosion resistance of the ground electrode or the center electrode can be improved.

BRIEF DESCRIPTION OF THE DRAWINGS

FIG. 15 is a table showing the results of judgment on separation in the first to third embodiments.

FIG. 16 is a table showing the results of judgment on separation in the fourth and fifth embodiments.

FIG. 19 is a table showing the results of a separation evaluation test conducted on samples of the second embodiment having different welding angles θ.

FIG. 20 is a table showing the results of a separation evaluation test conducted on samples of the fourth embodiment having different welding angles θ.

DETAILED DESCRIPTION OF THE INVENTION

Embodiments of the present invention will next be described with reference to the drawings in the following order:

A. First embodiment (a ground electrode having an electrode tip, type 1);
B. Second embodiment (a ground electrode having an electrode tip, type 2);
C. Third embodiment (a ground electrode having an electrode tip, type 3);
D. Fourth embodiment (a center electrode having an electrode tip, type 1);
E. Fifth embodiment (a center electrode having an electrode tip, type 2);
F. Evaluation tests; and
G Conclusion.

A. FIRST EMBODIMENT

A Ground Electrode Having an Electrode Tip, Type 1

Figure 1:
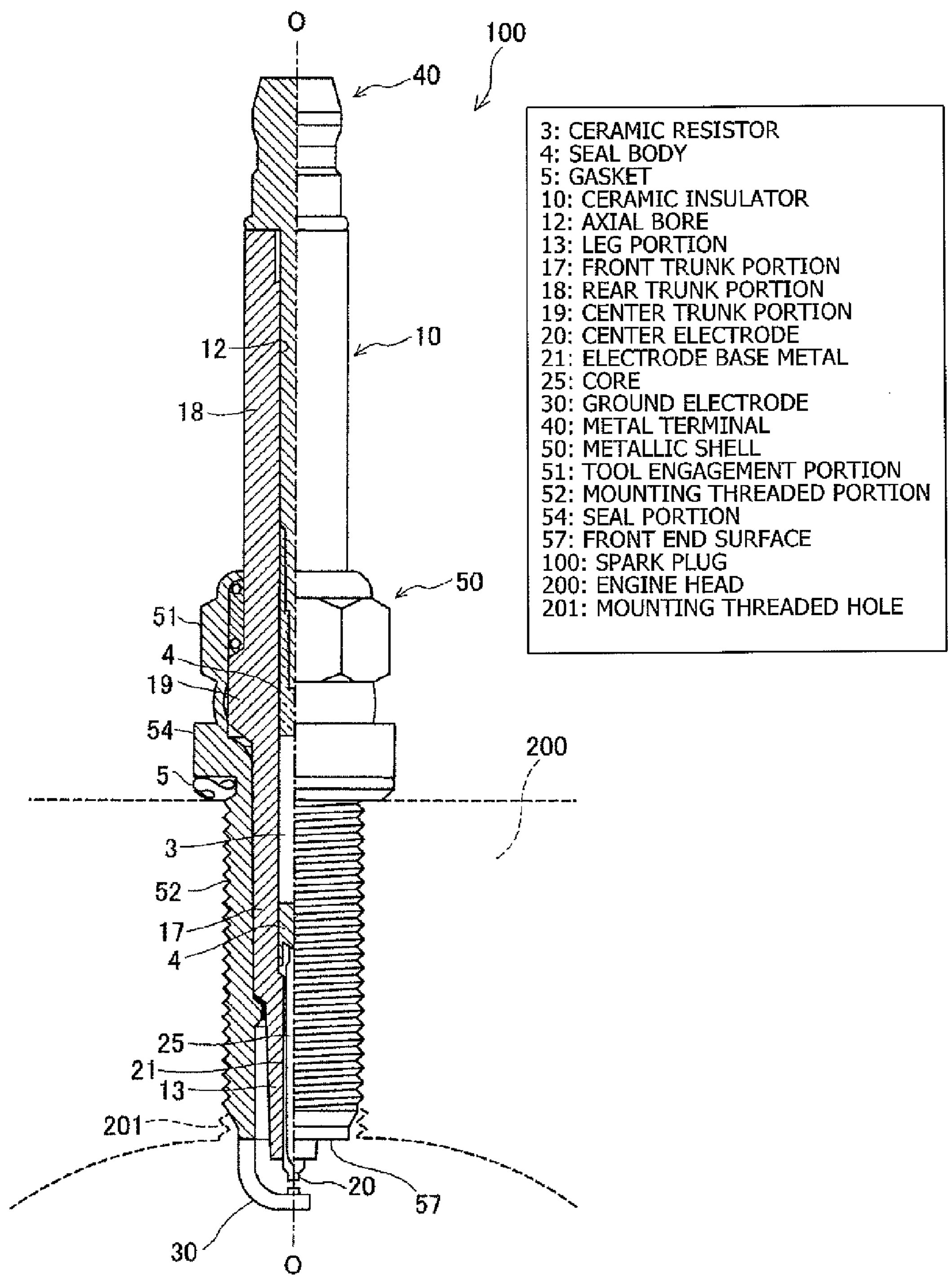
FIG. 1 is a partially sectional view showing a spark plug 100 according to a first embodiment of the present invention.

FIG. 1 is a partially sectional view of a spark plug 100 according to a first embodiment of the present invention. The spark plug 100 includes a ceramic insulator 10, a center electrode 20, a ground electrode 30, a metal terminal 40, and a metallic shell 50. The center electrode 20 has a rodlike shape, projects from one end of the ceramic insulator 10, and is electrically connected to the metal terminal 40 provided at the other end of the ceramic insulator 10, through the interior of the ceramic insulator 10. The outer circumference of the center electrode 20 is held by the ceramic insulator 10, and the outer circumference of the ceramic insulator 10 is held by the metallic shell 50 at a position located away from the metal terminal 40. The ground electrode 30 is electrically connected to the metallic shell 50 and forms a spark gap, across which sparks are generated, in cooperation with the front end of the center electrode 20. The spark plug 100 is mounted, via the metallic shell 50, to a mounting threaded hole 201 formed in an engine head 200 of an internal combustion engine. When a high voltage of 20,000 to 30,000 volts is applied to the metal terminal 40, sparks are generated across the spark gap formed between the center electrode 20 and the ground electrode 30.

The ceramic insulator 10 is an insulator formed through firing of a ceramic material, such as alumina. The ceramic insulator 10 is a tubular member having an axial bore 12 formed at the center thereof and adapted to accommodate the center electrode 20 and the metal terminal 40. The ceramic insulator 10 has a center trunk portion 19 formed at the axial center thereof and having a large outside diameter. The ceramic insulator 10 has a rear trunk portion 18 located on a side toward the metal terminal 40 with respect to the center trunk portion 19 and adapted to electrically insulate the metal terminal 40 and the metallic shell 50 from each other. The ceramic insulator 10 has a front trunk portion 17 located on a side toward the center electrode 20 with respect to the center trunk portion 19 and having an outside diameter smaller than that of the rear trunk portion 18. The ceramic insulator 10 has a leg portion 13 located frontward of the front trunk portion 17 and having an outside diameter which is smaller than that of the front trunk portion 17 and reduces toward the front end of the center electrode 20.

The metallic shell 50 is a cylindrical metal member which holds the ceramic insulator 10 therein while surrounding a region of the ceramic insulator 10 extending from a subportion of the rear trunk portion 18 to the leg portion 13. In the present embodiment, the metallic shell 50 is formed from low-carbon steel. The metallic shell 50 includes a tool engagement portion 51, a mounting threaded portion 52, and a seal portion. 54. The tool engagement portion 51 of the metallic shell 50 allows a tool (not shown) for mounting the spark plug 100 to the engine head 200 to be fitted thereto. The mounting threaded portion 52 of the metallic shell 50 has a thread to be threadingly engaged with the mounting threaded hole 201 of the engine head 200. The seal portion 54 of the metallic shell 50 is a flange-like portion formed at the base of the mounting threaded portion 52. An annular gasket 5 formed by folding a sheet is fitted between the seal portion 54 and the engine head 200. A front end surface 57 of the metallic shell 50 has an annular shape. At the center of the front end surface 57, the center electrode 20 projects from the leg portion 13 of the ceramic insulator 10.

The center electrode 20 is a rodlike electrode having a structure in which a core 25 superior in thermal conductivity to an electrode base metal 21 is embedded within the electrode base metal 21 having a closed-bottomed tubular shape. In the present embodiment, the electrode base metal 21 is formed from a nickel alloy which contains nickel as a main component. The core 25 is formed from copper or from an alloy which contains copper as a main component. The center electrode 20 is inserted into the axial bore 12 of the ceramic insulator 10 in such a manner that the front end of the electrode base metal 21 projects from the axial bore 12 of the ceramic insulator 10. The center electrode 20 is electrically connected to the metal terminal 40 via a ceramic resistor 3 and a seal body 4.

The ground electrode 30 is joined to the front end surface 57 of the metallic shell 50 and is bent in a direction intersecting with the direction of an axis O of the center electrode 20 and such that the inner surface of a distal end portion thereof faces the front end of the center electrode 20. In the present embodiment, the ground electrode 30 is formed from a nickel alloy, such as INCONEL, which contains nickel as a main component.

Figure 2:
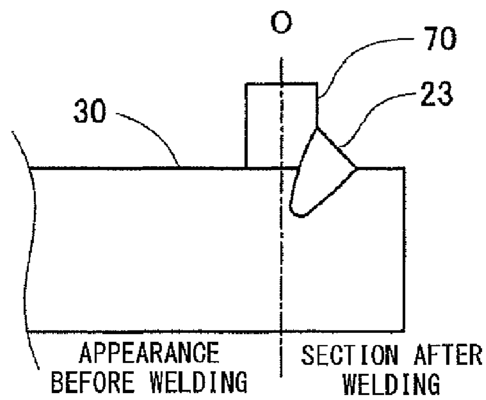
FIG. 2 is an enlarged view showing a distal end portion of a ground electrode 30 of the first embodiment.

FIG. 2 is a view showing, on an enlarged scale, a distal end portion of the ground electrode 30. As shown in FIG. 2, a circular columnar electrode tip 70 is joined by laser welding to a distal end portion of the ground electrode 30 at a position which faces the center electrode 20. In FIG. 2, an appearance before laser welding is shown at the left of the axis O, and a section taken after laser welding is shown at the right. The electrode tip 70 is a member provided for improving resistance to spark-induced erosion of the ground electrode 30. The electrode tip 70 is formed from a material which contains a noble metal of high melting point as a main component. The electrode tip 70 is formed from, for example, platinum (Pt), iridium (Ir), ruthenium (Ru), or rhodium (Rh) or from an alloy thereof. In the present embodiment, the electrode tip 70 is formed from a Pt—Ir alloy.

As shown in FIG. 2, the ground electrode 30 and the electrode tip 70 are laser-welded together through radiation of a laser beam to the boundary between the ground electrode 30 and the electrode tip 70 from a direction oblique to the boundary along the full circle. As a result of such laser welding, a boundary portion between the ground electrode 30 and the electrode tip 70 is melted, thereby forming a fusion zone 23.

The ground electrode 30 and the electrode tip 70 have different linear expansion coefficients. The linear expansion coefficient of the ground electrode 30 is greater than that of the electrode tip 70. Specifically, the ground electrode 30 of the present embodiment is formed from INCONEL 601 (trade name) and has a linear expansion coefficient of 17.8. The electrode tip 70 is formed from a Pt—Ir alloy and has a linear expansion coefficient of 10.0. In the present embodiment and the following embodiments, the linear expansion coefficient is a value as measured at 1,000° C. and in [$\times 10^{-6}$].

Figure 3:
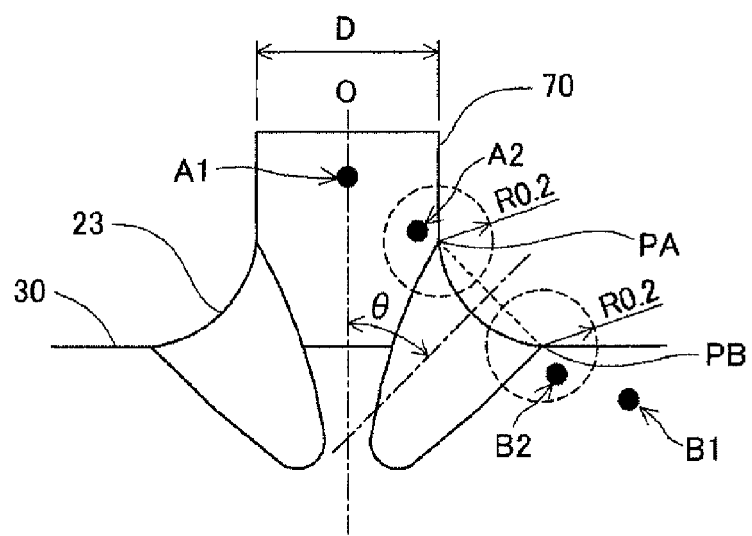
FIG. 3 is a sectional view showing a distal end portion of the ground electrode 30 of the first embodiment.

FIG. 3 is a view showing the section of a distal end portion of the ground electrode 30 which contains the center axis O of the electrode tip 70. In FIG. 3, a tip width D is of the electrode tip 70 as measured in a direction orthogonal to the center axis O and can be 0.4 mm to 1.2 mm inclusive. The present embodiment employs the electrode tip 70 having a tip width D of 0.6 mm.

The spark plug 100 of the first embodiment is formed in such a manner as to satisfy the condition $0.8 \leq A1/A2 \leq 1.9$, where, as viewed on a section which contains the center axis O of the electrode tip 70, A1 [Hv] is the hardness of the electrode tip 70 as measured outside a circle having a radius of 0.2 mm, with a boundary point PA on a surface of the spark plug 100 between the fusion zone 23 and the electrode tip 70 serving as the center of the circle, and A2 [Hv] is the hardness of the electrode tip 70 as measured within the circle having a radius of 0.2 mm. This condition is hereinafter referred to as the "tip hardness condition." In the structure of the ground electrode 30 of the first embodiment, through satisfaction of the above-mentioned tip hardness condition, separation of the electrode tip 70 from the fusion zone 23 can be restrained. Hardness [Hv] is Vickers hardness as measured by the hardness measuring method specified in Japanese Industrial Standards (JIS) "Z 2244" under the following conditions: a test force of 1.961 N and a holding time of 15 sec.

Also, the spark plug 100 of the first embodiment is formed in such a manner as to satisfy the condition $0.7 \leq B2/B1 \leq 2.5$, where, as viewed on the section which contains the center axis O of the electrode tip 70, B1 [Hv] is the hardness of the ground electrode 30 as measured outside a circle having a radius of 0.2 mm, with a boundary point PB on a surface of the spark plug 100 between the fusion zone 23 and the ground electrode 30 serving as the center of the circle, and B2 [Hv] is the hardness of the ground electrode 30 as measured within the circle having a radius of 0.2 mm This condition is hereinafter referred to as the "ground-electrode hardness condition." In the structure of the ground electrode 30 of the first embodiment, through satisfaction of the above-mentioned ground-electrode hardness condition, separation of the electrode tip 70 together with the fusion zone 23 from the ground electrode 30 can be restrained.

Furthermore, in the first embodiment, the electrode tip 70 and the ground electrode 30 are laser-welded together in such a manner as to satisfy the condition $60° \leq \theta \leq 150°$, where, as viewed on a section which contains the center axis O of the electrode tip 70 and provides the maximum vertical width of the fusion zone 23, θ (hereinafter referred to as the "welding angle θ") is an angle between the center axis O and a perpendicular bisector of a line segment connecting the boundary point PA and the boundary point PB. This condition is hereinafter referred to as the "welding angle condition." In the structure of the ground electrode 30 of the first embodiment, through satisfaction of the above-mentioned welding angle condition, separation of the electrode tip 70 from the ground electrode 30 can be more effectively restrained.

The tip hardness condition, the ground-electrode hardness condition, and the welding angle condition mentioned above for the first embodiment are determined on the basis of the results of various evaluation tests to be mentioned later. The contents of the evaluation tests will be described in detail later.

B. SECOND EMBODIMENT

A Ground Electrode Having an Electrode Tip, Type 2

Figure 4:
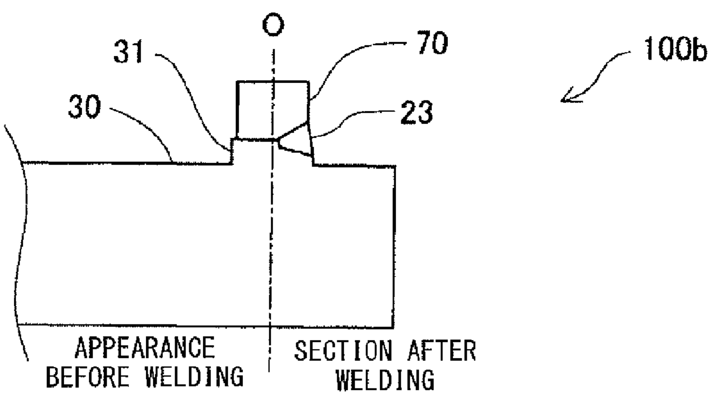
FIG. 4 is an enlarged view showing a distal end portion of the ground electrode 30 of a second embodiment.

FIG. 4 is a view showing, on an enlarged scale, a distal end portion of the ground electrode 30 of a spark plug 100*b* of the second embodiment. As shown in FIG. 4, in the second embodiment, a pedestal portion 31 protrudes from a side of a distal end portion of the ground electrode 30 which faces the center electrode 20, and the electrode tip 70 is laser-welded onto the pedestal portion 31. The pedestal portion 31 can be formed by subjecting the base metal of the ground electrode 30 to, for example, press forming or cutting. Also, in the second embodiment, the linear expansion coefficient of the ground electrode 30 is greater than that of the electrode tip 70. Specifically, the ground electrode 30 is formed from INCONEL 601 and has a linear expansion coefficient of 17.8. The electrode tip 70 is formed from a Pt—Ni alloy and has a linear expansion coefficient of 13.4.

Figure 5:
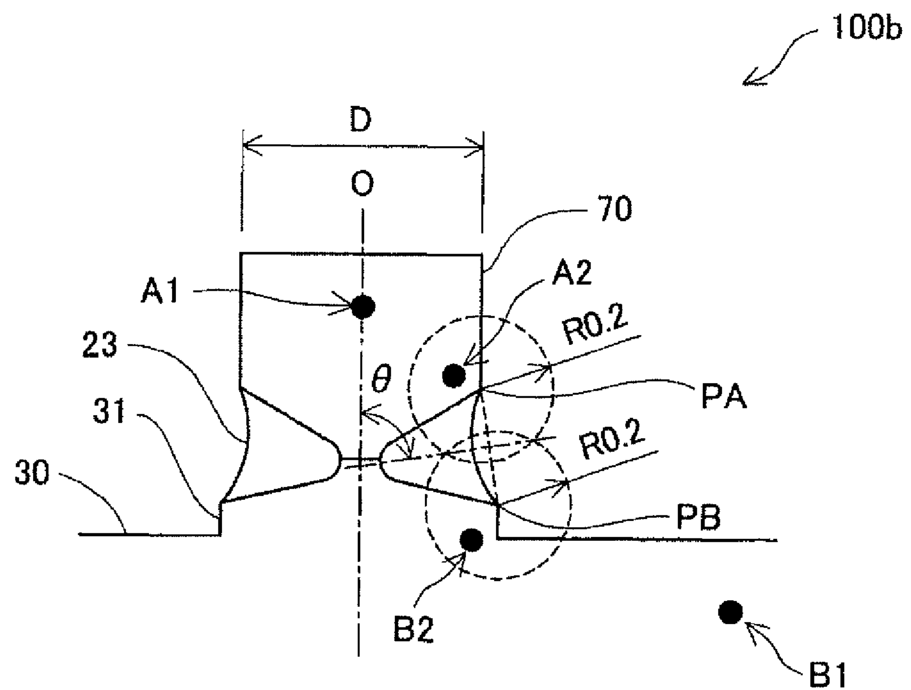
FIG. 5 is a sectional view showing a distal end portion of the ground electrode 30 of the second embodiment.

FIG. 5 is a view showing the section of a distal end portion of the ground electrode 30 which contains the center axis O of the electrode tip 70. Also, in the present embodiment, similar to the first embodiment, the tip width D can be 0.4 mm to 1.2 mm inclusive. The present embodiment employs the electrode tip 70 having a tip width D of 0.6 mm.

Similar to the first embodiment, the spark plug 100*b* of the second embodiment is formed in such a manner as to satisfy the tip hardness condition $0.8 \leq A1/A2 \leq 1.9$, where, as viewed on a section which contains the center axis O of the electrode tip 70, A1 [Hv] is the hardness of the electrode tip 70 as measured outside a circle having a radius of 0.2 mm, with the boundary point PA on a surface of the spark plug 100*b* between the fusion zone 23 and the electrode tip 70 serving as the center of the circle, and A2 [Hv] is the hardness of the electrode tip 70 as measured within the circle having a radius of 0.2 mm. In the structure of the ground electrode 30 of the second embodiment, through satisfaction of the above-mentioned tip hardness condition, separation of the electrode tip 70 from the fusion zone 23 can be restrained.

Similar to the first embodiment, the spark plug 100*b* of the second embodiment is formed in such a manner as to satisfy the ground-electrode hardness condition $0.7 \leq B2/B1 \leq 2.5$, where, as viewed on the section which contains the center axis O of the electrode tip 70, B1 [Hv] is the hardness of the ground electrode 30 as measured outside a circle having a radius of 0.2 mm, with the boundary point PB on a surface of the spark plug 100*b* between the fusion zone 23 and the ground electrode 30 serving as the center of the circle, and B2 [Hv] is the hardness of the ground electrode 30 as measured within the circle having a radius of 0.2 mm. In the structure of the ground electrode 30 of the second embodiment, through satisfaction of the above-mentioned ground-electrode hardness condition, separation of the electrode tip 70 together with the fusion zone 23 from the pedestal portion 31 of the ground electrode 30 can be restrained.

Furthermore, similar to the first embodiment, in the second embodiment, the electrode tip 70 and the pedestal portion 31 of the ground electrode 30 are laser-welded together in such a manner as to satisfy the welding angle condition $60° \leq \theta \leq 150°$. In the structure of the ground electrode 30 of the second embodiment, through satisfaction of the above-mentioned welding angle condition, separation of the electrode tip 70 from the pedestal portion 31 of the ground electrode 30 can be more effectively restrained.

The tip hardness condition, the ground-electrode hardness condition, and the welding angle condition mentioned above for the second embodiment are determined on the basis of the results of various evaluation tests to be mentioned later. The contents of the evaluation tests will be described in detail later.

C. THIRD EMBODIMENT

A Ground Electrode Having an Electrode Tip, Type 3

Figure 6:
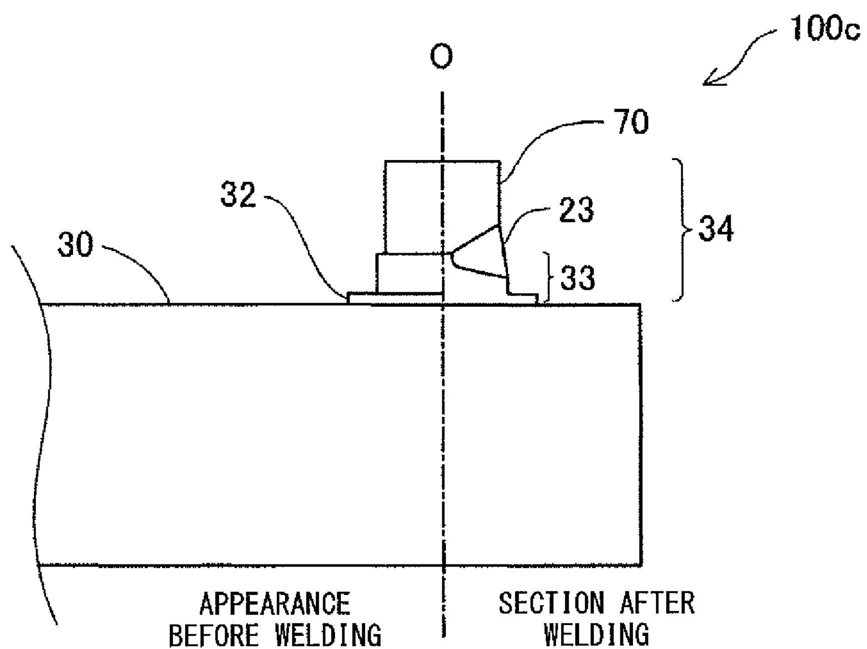
FIG. 6 is an enlarged view showing a distal end portion of the ground electrode 30 of a third embodiment.

FIG. 6 is a view showing, on an enlarged scale, a distal end portion of the ground electrode 30 of a spark plug 100*c* of the third embodiment. As shown in FIG. 6, in the third embodiment, the electrode tip 70 is laser-welded to the top surface of a convex intermediate tip 33 having a flange portion 32 at the bottom thereof to thereby form a composite tip 34, and the composite tip 34 is resistance-welded to a distal end portion of the ground electrode 30 via the bottom flange portion 32. The intermediate tip 33 can be formed from, for example, the same material as that used to form the ground electrode 30. The linear expansion coefficient of the intermediate tip 33 is greater than that of the electrode tip 70. Specifically, the intermediate tip 33 is formed from INCONEL 601 and has a linear expansion coefficient of 17.8. The electrode tip 70 is formed from a Pt—Ni alloy and has a linear expansion coefficient of 15.0.

Figure 7:
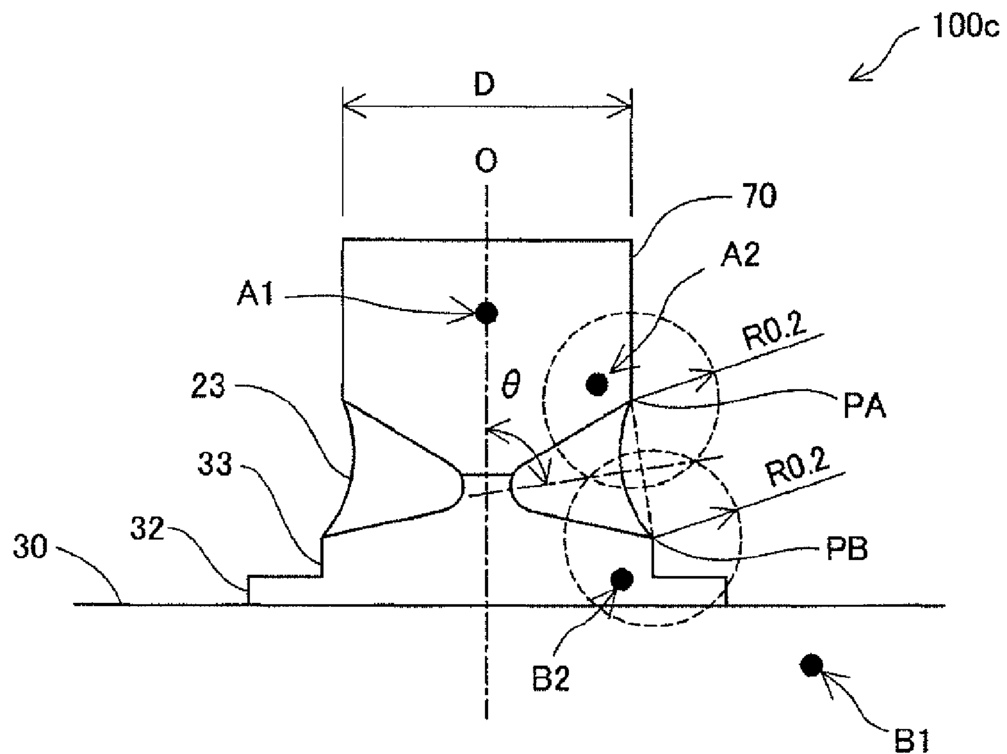
FIG. 7 is a sectional view showing a distal end portion of the ground electrode 30 of the third embodiment.

FIG. 7 is a view showing the section of a distal end portion of the ground electrode 30 which contains the center axis O of the electrode tip 70. Also, in the present embodiment, similar to the first embodiment, etc., the tip width D can be 0.4 mm to 1.2 mm inclusive. The present embodiment employs the electrode tip 70 having a tip width D of 0.6 mm.

Similar to the first embodiment and the second embodiment, the spark plug 100*c* of the third embodiment is formed in such a manner as to satisfy the tip hardness condition $0.8 \leq A1/A2 \leq 1.9$, where, as viewed on a section which contains the center axis O of the electrode tip 70, A1 [Hv] is the hardness of the electrode tip 70 as measured outside a circle having a radius of 0.2 mm, with the boundary point PA on a surface of the spark plug 100*c* between the fusion zone 23 and the electrode tip 70 serving as the center of the circle, and A2 [Hv] is the hardness of the electrode tip 70 as measured within the circle having a radius of 0.2 mm. In the structure of the ground electrode 30 of the third embodiment, through satisfaction of the above-mentioned tip hardness condition, separation of the electrode tip 70 from the fusion zone 23 can be restrained.

The spark plug 100*c* of the third embodiment is formed in such a manner as to satisfy the ground-electrode hardness condition $0.5 \leq B2/B1 \leq 2.5$, where, as viewed on the section which contains the center axis O of the electrode tip 70, B1 [Hv] is the hardness of the ground electrode 30 as measured outside a circle having a radius of 0.2 mm, with the boundary point PB on a surface of the spark plug 100*c* between the fusion zone 23 and the intermediate tip 33 serving as the center of the circle, and B2 [Hv] is the hardness of the intermediate tip 33 as measured within the circle having a radius of 0.2 mm. In the structure of the ground electrode 30 of the third embodiment, through satisfaction of the above-mentioned ground-electrode hardness condition, separation of the electrode tip 70 together with the fusion zone 23 from the intermediate tip 33 can be restrained.

Furthermore, similar to the first embodiment and the second embodiment, in the third embodiment, the electrode tip 70 and the intermediate tip 33 are laser-welded together in such a manner as to satisfy the welding angle condition $60° \leq \theta \leq 150°$. In the structure of the ground electrode 30 of the third embodiment, through satisfaction of the above-mentioned welding angle condition, separation of the electrode tip 70 from the intermediate tip 33 can be more effectively restrained.

The tip hardness condition, the ground-electrode hardness condition, and the welding angle condition mentioned above for the third embodiment are determined on the basis of the results of various evaluation tests to be mentioned later. The contents of the evaluation tests will be described in detail later.

D. FOURTH EMBODIMENT

A Center Electrode Having an Electrode Tip, Type 1

Figure 8:
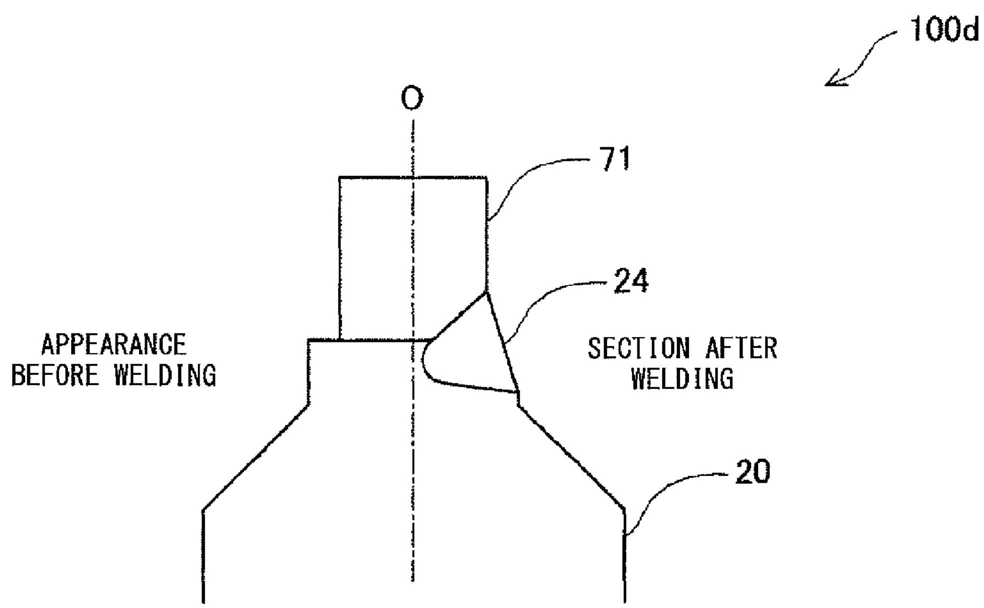
FIG. 8 is an enlarged view showing a front end portion of a center electrode 20 of a fourth embodiment.

FIG. 8 is a view showing, on an enlarged scale, a front end portion of the center electrode 20 of a spark plug 100*d* of the fourth embodiment. FIG. 8 shows the front end portion of the center electrode 20 in a state in which the spark plug 100 shown in FIG. 1 is turned by 180°. As shown in FIG. 8, in the fourth embodiment, a circular columnar electrode tip 71 is joined to the center of the front end surface of the center electrode 20, rather than to the ground electrode 30. The center electrode 20 and the electrode tip 70 are laser-welded together through radiation of a laser beam to the boundary between the center electrode 20 and the electrode tip 71 along the full circle. The linear expansion coefficient of the center electrode 20 is greater than that of the electrode tip 71. Specifically, the center electrode 20 is formed from INCONEL 600 and has a linear expansion coefficient of 16.4. The electrode tip 71 is formed from an Ir—Pt alloy and has a linear expansion coefficient of 8.9.

Figure 9:
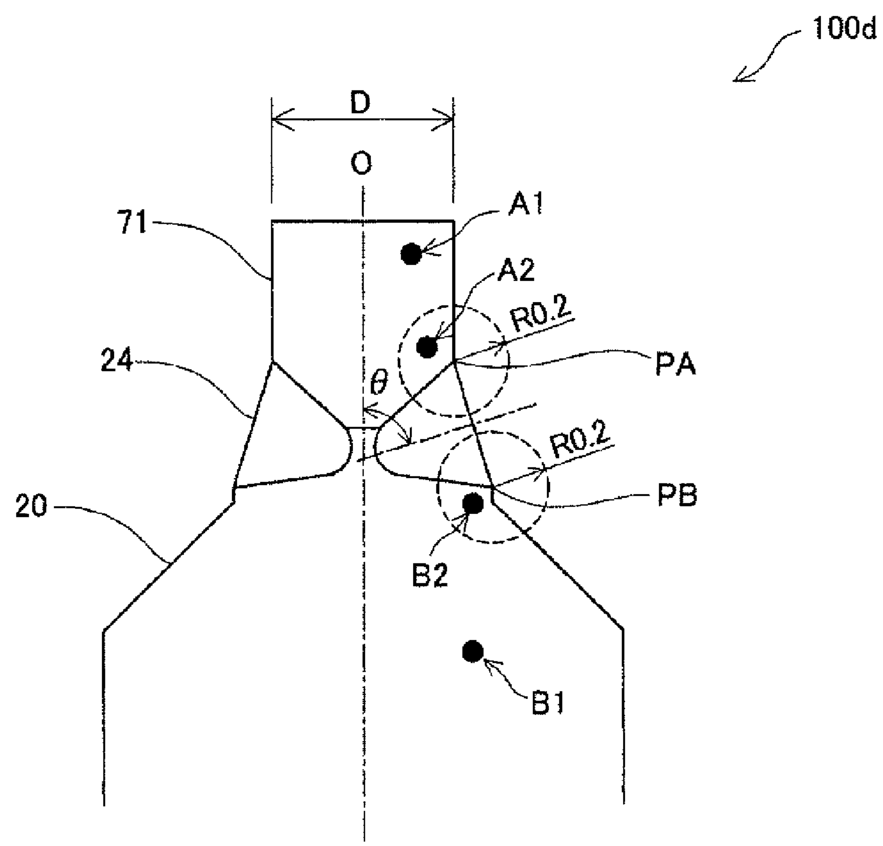
FIG. 9 is a sectional view showing a front end portion of the center electrode 20 of the fourth embodiment.

FIG. 9 is a view showing the section of a front end portion of the center electrode 20 which contains the center axis O of the electrode tip 71. In FIG. 9, the tip width D is of the electrode tip 71 as measured in a direction orthogonal to the center axis O and can be 0.4 mm to 1.2 mm inclusive. The present embodiment employs the electrode tip 71 having a tip width D of 0.6 mm.

Similar to the above-described embodiments, the spark plug 100*d* of the fourth embodiment is formed in such a manner as to satisfy the tip hardness condition $0.8 \leq A1/A2 \leq 1.9$, where, as viewed on a section which contains the center axis O of the electrode tip 71, A1 [Hv] is the hardness of the electrode tip 71 as measured outside a circle having a radius of 0.2 mm, with the boundary point PA on a surface of the spark plug 100*d* between a fusion zone 24 and the electrode tip 71 serving as the center of the circle, and A2 [Hv] is the hardness of the electrode tip 71 as measured within the circle having a radius of 0.2 mm. In the structure of the center electrode 20 of the fourth embodiment, through satisfaction of the above-mentioned tip hardness condition, separation of the electrode tip 71 from the fusion zone 24 can be restrained.

The spark plug 100*d* of the fourth embodiment is formed in such a manner as to satisfy the condition $0.7 \leq B2/B1 \leq 2.3$, where, as viewed on the section which contains the center axis O of the electrode tip 70, B1 [Hv] is the hardness of the center electrode 20 as measured outside a circle having a radius of 0.2 mm, with the boundary point PB on a surface of the spark plug 100*d* between the fusion zone 24 and the center electrode 20 serving as the center of the circle, and B2 [Hv] is the hardness of the center electrode 20 as measured within the circle having a radius of 0.2 mm. This condition is hereinafter referred to as the "center-electrode hardness condition." In the structure of the center electrode 20 of the fourth embodiment, through satisfaction of the above-mentioned center-electrode hardness condition, separation of the electrode tip 71 together with the fusion zone 23 from the center electrode 20 can be restrained.

Furthermore, in the fourth embodiment, the electrode tip 71 and the center electrode 20 are laser-welded together in such a manner as to satisfy the welding-angle condition 30°≤θ≤90°, where, as viewed on a section which contains the center axis O of the electrode tip 71 and provides the maximum vertical width of the fusion zone 23, θ (welding angle θ) is an angle between the center axis O and a perpendicular bisector of a line segment connecting the boundary point PA and the boundary point PB. In the structure of the center electrode 20 of the fourth embodiment, through satisfaction of the above-mentioned welding angle condition, separation of the electrode tip 71 from the center electrode 20 can be more effectively restrained.

The tip hardness condition, the ground-electrode hardness condition, and the welding angle condition mentioned above for the fourth embodiment are determined on the basis of the results of various evaluation tests to be mentioned later. The contents of the evaluation tests will be described in detail later.

E. FIFTH EMBODIMENT

A Center Electrode Having an Electrode Tip, Type 2

Figure 10:
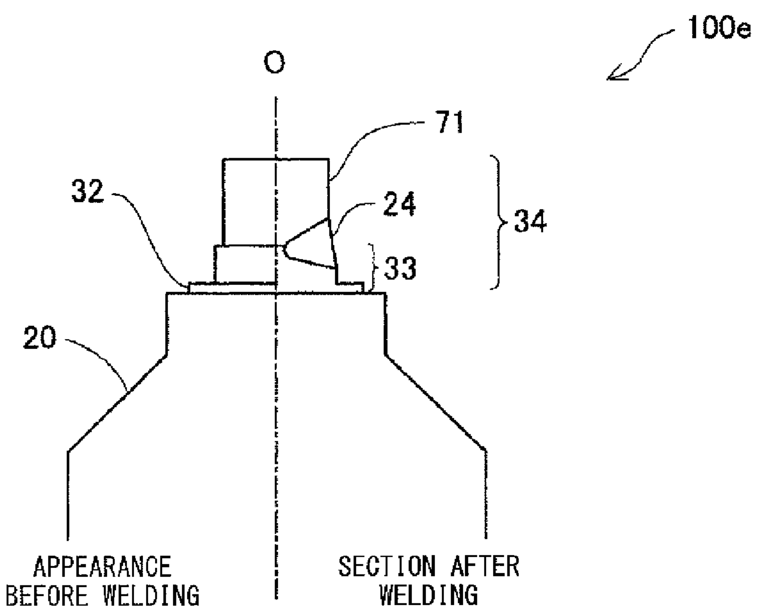
FIG. 10 is an enlarged view showing a front end portion of the center electrode 20 of a fifth embodiment.

FIG. 10 is a view showing, on an enlarged scale, a front end portion of the center electrode 20 of a spark plug 100*e* of the fifth embodiment. As shown in FIG. 10, the composite tip 34 composed of the intermediate tip 33 and the electrode tip 71 is resistance-welded to the front end surface of the center electrode 20 of the spark plug 100*e* of the fifth embodiment. The structure of the composite tip 34 is similar to that of the third embodiment. The linear expansion coefficient of the intermediate tip 33 is greater than that of the electrode tip 71. Specifically, the intermediate tip 33 is formed from the same material as that used to form the center electrode 20; i.e., INCONEL 600, and has a linear expansion coefficient of 16.4. The electrode tip 71 is formed from an Ir—Pt alloy and has a linear expansion coefficient of 8.9.

Figure 11:
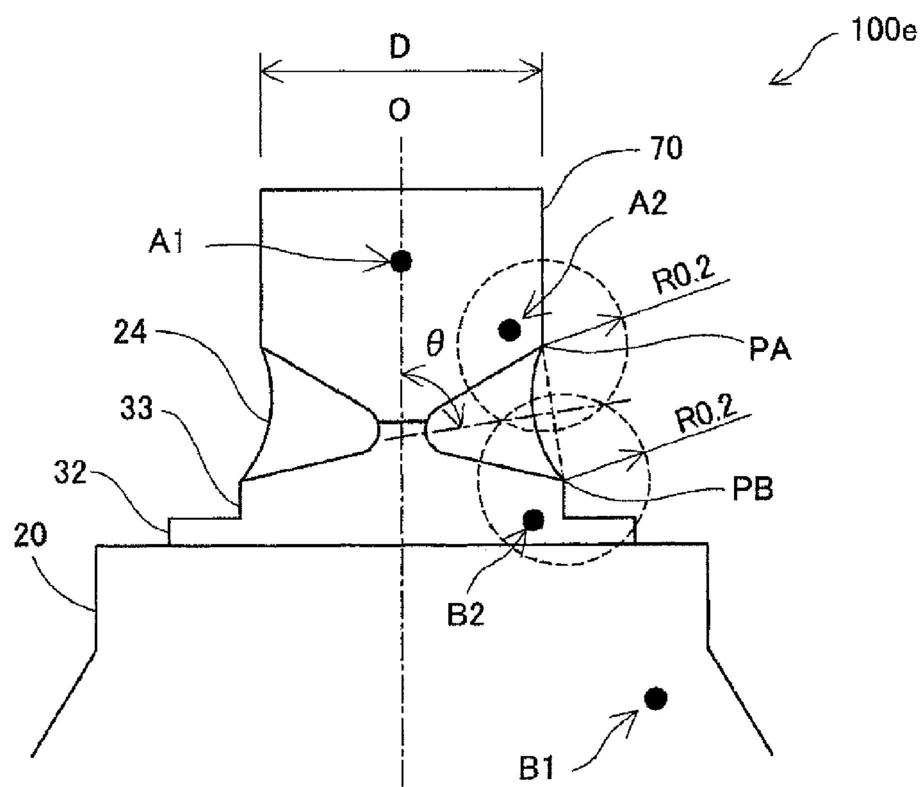
FIG. 11 is a sectional view showing a front end portion of the center electrode 20 of the fifth embodiment.

FIG. 11 is a view showing the section of a front end portion of the center electrode 20 which contains the center axis O of the electrode tip 71. Also, in the present embodiment, similar to the fourth embodiment, the tip width D can be 0.4 mm to 1.2 mm inclusive. The present embodiment employs the electrode tip 71 having a tip width D of 0.6 mm.

Similar to the above-described embodiments, the spark plug 100*e* of the fifth embodiment is formed in such a manner as to satisfy the tip hardness condition 0.8≤A1/A2≤1.9, where, as viewed on a section which contains the center axis O of the electrode tip 71, A1 [Hy] is the hardness of the electrode tip 71 as measured outside a circle having a radius of 0.2 mm, with the boundary point PA on a surface of the spark plug 100*e* between the fusion zone 24 and the electrode tip 71 serving as the center of the circle, and A2 [Hv] is the hardness of the electrode tip 71 as measured within the circle having a radius of 0.2 mm. In the structure of the center electrode 20 of the fifth embodiment, through satisfaction of the above-mentioned tip hardness condition, separation of the electrode tip 71 from the fusion zone 24 can be restrained.

The spark plug 100*e* of the fifth embodiment is formed in such a manner as to satisfy the center-electrode hardness condition 0.7≤B2/B1≤2.3, where, as viewed on the section which contains the center axis O of the electrode tip 71, B1 [Hv] is the hardness of the center electrode 20 as measured outside a circle having a radius of 0.2 mm, with the boundary point PB on a surface of the spark plug 100*e* between the fusion zone 24 and the intermediate tip 33 serving as the center of the circle, and B2 [Hv] is the hardness of the intermediate tip 33 as measured within the circle having a radius of 0.2 mm. In the structure of the ground electrode 30 of the fifth embodiment, through satisfaction of the above-mentioned center-electrode hardness condition, separation of the electrode tip 70 together with the fusion zone 23 from the intermediate tip 33 can be restrained.

Furthermore, similar to the fourth embodiment, in the spark plug 100*e* of the fifth embodiment, the electrode tip 71 and the intermediate tip 33 are laser-welded together in such a manner as to satisfy the welding angle condition 30°≤θ≤90°. In the structure of the center electrode 20 of the fifth embodiment, through satisfaction of the above-mentioned welding angle condition, separation of the electrode tip 71 from the intermediate tip 33 can be more effectively restrained.

F. EVALUATION TESTS

F-1. Grounds for Focusing on a Circle Having a Radius of 0.2 mm with a Boundary Point Serving as the Center of the Circle Grounds for the tip hardness condition, the ground-electrode hardness condition, the center-electrode hardness condition, and the welding angle condition specified in the above-described embodiments will next be described on the basis of the results of evaluation tests. First, regarding the tip hardness condition, the ground-electrode hardness condition, and the center-electrode hardness condition, there is described grounds for focusing on hardness of material as measured outside and within a circle having a radius of 0.2 mm, with the boundary point PA or PB serving as the center of the circle, the boundary points PA and PB being located at the upper end and the lower end, respectively, of the fusion zone.

Figure 12:
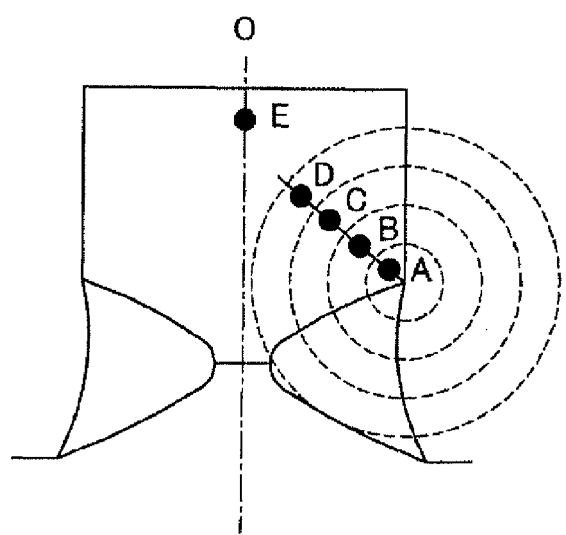
FIG. 12 is a view showing imaginary circles with a boundary point PA serving as the centers thereof on the section of an electrode tip 70.

FIG. 12 shows imaginary circles drawn on a section which contains the center axis O of the electrode tip 70. The imaginary circles are concentric circles whose center is located at the boundary point PA and whose radii increase 0.1 mm by 0.1 mm from the innermost circle. The hardness of the electrode tip 70 was measured at measuring points A, B, C, and D, which are midpoints between the imaginary circles and are located on a bisector of the angle between the side surface of the electrode tip 70 and the boundary line between the fusion zone 23 and the electrode tip 70. The electrode tip 70 formed from a Pt alloy was used as a sample for the measurement. The measuring point "E" appearing in FIG. 12 is located on the center axis O of the electrode tip 70 and sufficiently away from the fusion zone. Hardness measured at the point E is the hardness of the electrode tip 70 itself.

Figures 13, 14:
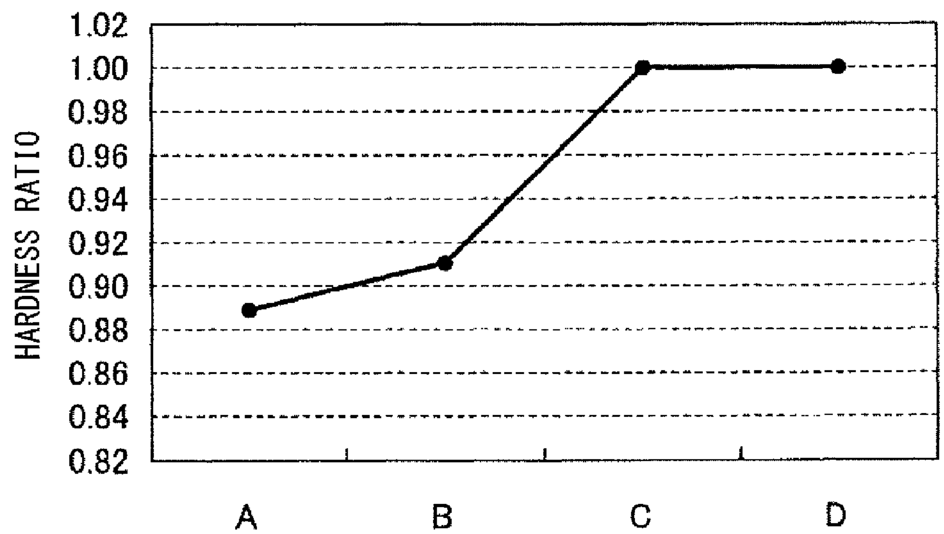
FIG. 13 is a table showing the results of measurement of hardness in the imaginary circles.
FIG. 14 is a graph in which hardness ratios in the imaginary circles are plotted.

FIG. 13 is a table showing the results of measurement of hardness in the imaginary circles. FIG. 13 shows hardnesses measured at the measuring points as well as ratios of the hardnesses measured at the measuring points to the hardness of the tip itself (hereinafter, referred to as the "hardness ratio(s)"). FIG. 14 is a graph in which hardness ratios in the imaginary circles are plotted. As shown in FIGS. 13 and 14, the hardness and the hardness ratio of the electrode tip 70 gradually increase with distance from the boundary point PA. At an outside point C; i.e., outside the imaginary circle having a radius of 0.2 mm, the hardness and the hardness ratio sharply increase, and the hardness ratio converges to "1." That is, a change in hardness caused by the influence of heat of laser welding substantially settles within a circle having a radius of 0.2 mm with the end point of the fusion zone serving as the center of the circle, and hardness is almost unsusceptible to heat of laser welding outside the circle having a radius of 0.2 mm. Thus, in the experiments to be described below, there was studied the influence, on the separation of the electrode tip 70, of the difference in hardness (hardness ratio) between a region influenced by heat of laser welding (within a circle having a radius of 0.2 mm with the boundary point serving as the center of the circle) and a region free from the influence of heat of laser welding (outside a circle having a radius of 0.2 mm with the boundary point serving as the center of the circle). Thus, the optimum ranges of the hardness conditions were determined.

F-2. Grounds for the Hardness Conditions

Next, grounds for the above-mentioned hardness conditions are described. Samples of the spark plugs according to the embodiments described above were prepared, six or seven samples each for the embodiments. The samples were measured for hardnesses of the relevant members at measuring points within and outside a circle having a radius of 0.2 mm with the end point of the fusion zone serving as the center of the circle. FIGS. 15 and 16 show the results of the measurement. The hardness measuring points A1, A2, B1, and B2 are shown in FIG. 3 for the first embodiment; in FIG. 5 for the second embodiment; in FIG. 7 for the third embodiment; in FIG. 8 for the fourth embodiment; and in FIG. 10 for the fifth embodiment.

FIGS. 15 and 16 show the results of measurement of hardness at the measuring points; the hardness ratio (A2/A1) with respect to the boundary point PA; the hardness ratio (B1/B2) with respect to the boundary point PB; and judgment on separation indicative of whether or not separation has occurred, and represented by "Good" or "Failure." "Good" indicates judgment that separation has not occurred. "Failure" indicates judgment that separation has occurred.

Figure 17:
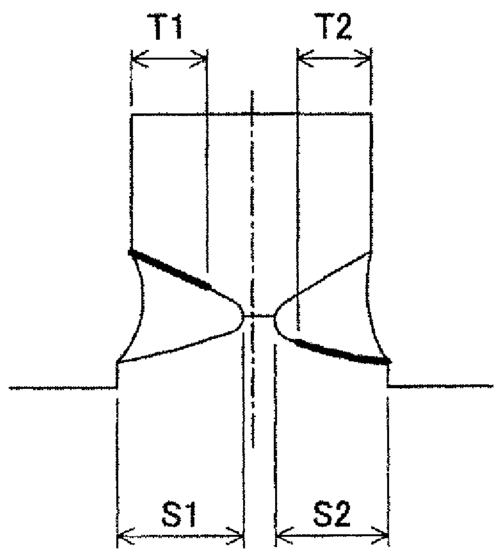
FIG. 17 is a view showing the definition of a separation rate used as a criterion for judgment on separation.

Whether or not separation has occurred was judged by the following method. First, by use of a burner, each of the samples is heated at an electrode tip and its vicinity to a temperature of 1,000° C. for two minutes; subsequently, the samples are exposed to the atmosphere and cooled for one minute. A series of the operations is taken as one test cycle. The samples are subjected to 1,000 test cycles. Subsequently, the samples are sectioned so as to yield a section which contains the center axis O. FIG. 17 shows the thus-obtained section of the electrode tip as well as the definition of a separation rate used as a criterion for judgment on separation.

Then, as viewed on the section of each of the electrode tips, cracks extending from the opposite side surfaces of the electrode tip along the boundary lines between the electrode tip and the fusion zones are measured for their horizontal widths T1 and T2. The percentage of the total of the crack widths to the total of horizontal widths S1 and S2 of the fusion zones is obtained. The thus-obtained percentage is hereinafter referred to as the "separation rate." When the separation rate is 50% or greater, judgment is made that separation has occurred. When the separation rate is less than 50%, judgment is made that separation has not occurred. A separation rate of 50% is used as a criterion for judgment for the following reason: when the separation rate is less than 50%, the electrode tip practically does not come to be detached from the ground electrode 30 or from the center electrode 20.

Among the samples of the first embodiment shown in FIG. 15, the samples which are judged to be "Good" with respect to separation have the range of the hardness ratio A1/A2 associated with the boundary point PA and the range of the hardness ratio B2/B1 associated with the boundary point PB as follows: $0.80 \leq A1/A2 \leq 1.90$, and $0.70 \leq B2/B1 \leq 2.50$.

Among the samples of the second embodiment, the samples which are judged to be "Good" with respect to separation have the range of the hardness ratio A1/A2 and the range of the hardness ratio B2/B1 as follows: $0.78 \leq A1/A2 \leq 1.92$, and $0.62 \leq B2/B1 \leq 2.51$.

Among the samples of the third embodiment, the samples which are judged to be "Good" with respect to separation have the range of the hardness ratio A1/A2 and the range of the hardness ratio B2/B1 as follows: $0.82 \leq A1/A2 \leq 1.91$, and $0.50 \leq B2/B1 \leq 2.50$.

From the above results of judgment, for the first embodiment and the second embodiment, as mentioned above, the range of the hardness ratio A1/A2 serving as the tip hardness condition has been determined to be $0.8 \leq A1/A2 \leq 1.9$, and the range of the hardness ratio B2/B1 serving as the ground-electrode hardness condition has been determined to be $0.7 \leq B2/B1 \leq 2.5$.

For the third embodiment, similar to the first and second embodiments, the range of the hardness ratio A1/A2 serving as the tip hardness condition has been determined to be $0.8 \leq A1/A2 \leq 1.9$, and the range of the hardness ratio B2/B1 serving as the ground-electrode hardness condition has been determined to be $0.5 \leq B2/B1 \leq 2.5$.

Among the samples of the fourth embodiment shown in FIG. 16, the samples which are judged to be "Good" with respect to separation have the range of the hardness ratio A1/A2 and the range of the hardness ratio B2/B1 as follows: $0.80 \leq A1/A2 \leq 1.90$, and $0.70 \leq B2/B1 \leq 2.32$.

Among the samples of the fifth embodiment, the samples which are judged to be "Good" with respect to separation have the range of the hardness ratio A1/A2 and the range of the hardness ratio B2/B1 as follows: $0.80 \leq A1/A2 \leq 1.91$, and $0.70 \leq B2/B1 \leq 2.33$.

From the above results of judgment, for the fourth embodiment and the fifth embodiment, the range of the hardness ratio A1/A2 serving as the tip hardness condition has been determined to be $0.8 \leq A1/A2 \leq 1.9$, and the range of the hardness ratio B2/B1 serving as the center-electrode hardness condition has been determined to be $0.7 \leq B2/B1 \leq 2.3$.

Generally, when the electrode tip and the base metal (the ground electrode, the intermediate tip, or the center electrode) are laser-welded together, after the welding, residual stress is generated in the vicinity of the boundary between the electrode tip and the fusion zone. Thus, in view of prevention of separation of the electrode tip at increased temperature, it is conceivably desirable to set the hardness A1 in the vicinity of the boundary between the electrode tip and the fusion zone higher than the hardness A2 of the electrode tip itself. However, when the hardness A1 is excessively high, cracking is generated in the boundary of the fusion zone immediately after welding. From such a point of view, in the above-mentioned evaluation tests, an upper limit of the hardness ratio A1/A2 of 1.9 has been obtained. However, in the above-mentioned evaluation tests, a lower limit of the hardness ratio A1/A2 of 0.8 has been obtained, revealing that, even when the hardness A2 is higher than the hardness A1, detachment of the electrode tip can be practically restrained.

Next, the relation between the fusion zone and the base metal will be considered. In the case where the hardness B2 in the vicinity of the boundary between the fusion zone and the base metal is lower than B1, at increased temperature, a higher effect of compressive stress is attained. Thus, the fusion zone is conceivably unlikely to separate from the base metal. From such a point of view, in the above-mentioned evaluation tests, a lower limit of the hardness ratio B2/B1 of 0.7 or 0.5 has been obtained. Meanwhile, when the hardness B2 in the vicinity of the boundary between the fusion zone and the base metal is excessively high, cracking is generated in the boundary immediately after welding. The above-mentioned evaluation tests have revealed that, when the upper limit of the hardness ratio B2/B1 is 2.5 or 2.3, a large crack is practically not generated, so that detachment of the electrode tip can be restrained.

F-3. Grounds for the Welding Angle (θ) Condition

Figure 18:
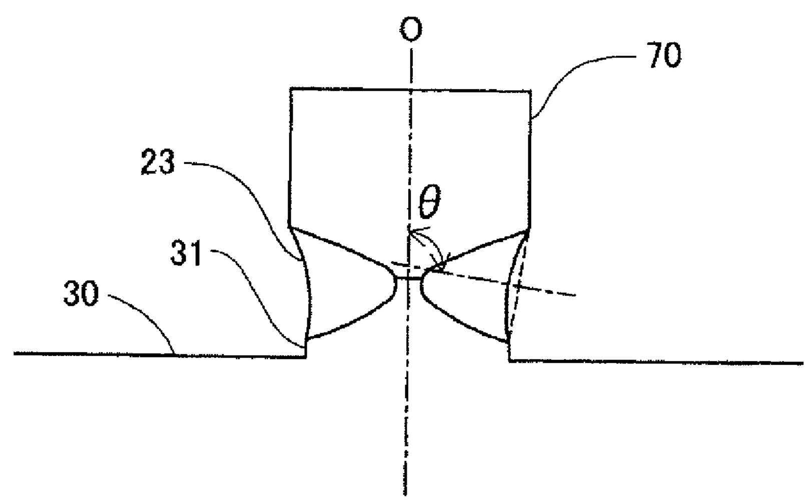
FIG. 18 is a sectional view of the ground electrode 30 at a welding angle of 90° or greater.

Finally, grounds for the range of the welding angle θ are described. Seven samples of the spark plug according to the second embodiment were prepared while the welding angle θ was varied from 43° to 163°. The samples were subjected to a separation evaluation test based on the separation rate. In this test, the welding angle θ was adjusted by means of changing the diameter of the pedestal portion 31 formed on the ground electrode 30 while the electrode tip 70 having a tip width D of 0.8 mm was used. FIG. 5 shows the section of the ground electrode 30 at a welding angle θ of less than 90°. When the welding angle becomes 90° or greater, as shown in FIG. 18, the width of the pedestal portion 31 becomes narrower than the tip width D.

FIG. 19 shows the results of the separation evaluation test conducted on the samples of the second embodiment having different welding angles θ. FIG. 19 shows, in addition to the welding angle θ, hardness at the measuring points B1 and B2, the hardness ratio B2/B1, and the result of judgment on separation. As shown in FIG. 19, the samples having a welding angle θ of 60° to 150° received a judgment of "Good" on separation. Thus, the welding angle condition for the first to third embodiments in which the electrode tip 70 is provided on the ground electrode has been determined to be $60° \leq \theta \leq 150°$ as mentioned above. Because of easy adjustment of the welding angle, the present test employed the samples of the second embodiment for evaluation. However, this evaluation method can also be applied to the first and third embodiments.

Seven samples of the spark plug according to the fourth embodiment were prepared while the welding angle θ was varied from 28° to 127°. The samples were subjected to a separation evaluation test based on the separation rate. In this test, the welding angle θ was adjusted by means of changing the diameter of a front end portion of the center electrode 20 while the electrode tip 71 having a tip width D of 0.6 mm was used.

FIG. 20 shows the results of the separation evaluation test conducted on the samples of the fourth embodiment having different welding angles θ. As shown in FIG. 20, the samples having a welding angle θ of 30° to 90° received a judgment of "Good" on separation. Thus, the welding angle condition for the fourth and fifth embodiments in which the electrode tip 71 is provided on the center electrode has been determined to be $30° \leq \theta \leq 90°$ as mentioned above. Because of easy adjustment of the welding angle, the present test employed the samples of the fourth embodiment for evaluation. However, this evaluation method can also be applied to the fifth embodiment.

G. CONCLUSION

According to the spark plugs of the embodiments described above, even when the electrode tip and the base metal (the ground electrode, the intermediate tip, or the center electrode) having different linear expansion coefficients are laser-welded together, a good relation can be established between the hardness in the vicinity of the fusion zone and the hardness of the base metal. Thus, there can be restrained separation or detachment of the electrode tip from the base metal caused by the generation of thermal stresses in the members, for example, in the course of operation of an internal combustion engine. As a result, erosion resistance of the spark plug can be improved; furthermore, the occurrence of misfire caused by an increase in gap can be restrained. Also, in the embodiments described above, not only hardness in the vicinity of the fusion zone but also the welding angle θ is specified, thereby restraining an increase in stress associated with thermal deformation. Therefore, separation or detachment of the electrode tip can be more effectively restrained.

While the present invention has been described with reference to the various embodiments, the present invention is not limited thereto, but may be embodied in various other configurations without departing from the gist of the invention. For example, the electrode tip may be joined to one of the center electrode 20 and the ground electrode 30 or to both of the center electrode 20 and the ground electrode 30.

DESCRIPTION OF REFERENCE NUMERALS

3: ceramic resistor;
4: seal body;
5: gasket;
10: ceramic insulator;
12: axial bore;
13: leg portion;
17: front trunk portion;
18: rear trunk portion;
19: center trunk portion;
20: center electrode;
21: electrode base metal;
22: electrode-base-metal pedestal;
23, 24: fusion zone;
25: core;
30: ground electrode;
31: pedestal portion;
32: flange portion;
33: intermediate tip;
34: composite tip;
40: metal terminal;
50: metallic shell;
51: tool engagement portion;
52: mounting threaded portion;
54: seal portion;
70, 71: electrode tip;
100, **100*b*, 100*c*, 100*d*, 100*e***: spark plug;
200: engine head; and
201: mounting threaded hole.

Having described the invention, the following is claimed:

1. A spark plug in which a substantially columnar electrode tip is welded to a distal end portion of a ground electrode, and a fusion zone is formed through the welding at a boundary portion between the ground electrode and the electrode tip, the spark plug satisfying a condition $$0.8 \leq A1/A2 \leq 1.9,$$

where, as viewed on a section which contains a center axis of the electrode tip, A1 [Hv] is hardness of the electrode tip as measured outside a circle having a radius of 0.2 mm, with a boundary point on a surface of the spark plug between the fusion zone and the electrode tip serving as the center of the circle, and A2 [Hv] is hardness of the electrode tip as measured within the circle having a radius of 0.2 mm.

2. A spark plug according to claim 1, satisfying a condition $$0.7 \leq B2/B1 \leq 2.5,$$

where, as viewed on the section, B1 is hardness [Hv] of the ground electrode as measured outside a circle having a radius of 0.2 mm, with a boundary point on a surface of the spark plug between the fusion zone and the ground electrode serving as the center of the circle, and B2 is hardness [Hv] of the ground electrode as measured within the circle having a radius of 0.2 mm.

3. A spark plug according to claim 1, wherein the ground electrode has a pedestal portion protruding from a distal end portion thereof, and the electrode tip is placed on the pedestal portion and is joined to the pedestal portion by means of a boundary portion between the pedestal portion and the electrode tip being subjected to welding.

4. A spark plug according to claim 1, wherein the ground electrode has a linear expansion coefficient greater than that of the electrode tip.

5. A spark plug in which a substantially columnar electrode tip is welded to a top surface of a convex intermediate tip having a flange portion at a bottom thereof to thereby form a composite tip having a fusion zone formed through the welding at a boundary portion between the intermediate tip and the electrode tip, and the composite tip is joined to a distal end portion of the ground electrode via the flange portion, the spark plug satisfying a condition $$0.8 \leq A1/A2 \leq 1.9,$$

where, as viewed on a section which contains a center axis of the electrode tip, A1 [Hv] is hardness of the electrode tip as measured outside a circle having a radius of 0.2 mm, with a boundary point on a surface of the spark plug between the fusion zone and the electrode tip serving as the center of the circle, and A2 [Hv] is hardness of the electrode tip as measured within the circle having a radius of 0.2 mm.

6. A spark plug according to claim 5, satisfying a condition $$0.5 \leq B2/B1 \leq 2.5,$$

where, as viewed on the section, B1 is hardness [Hv] of the ground electrode as measured outside a circle having a radius of 0.2 mm with, a boundary point on a surface of the spark plug between the fusion zone and the intermediate tip serving as the center of the circle, and B2 is hardness [Hv] of the intermediate tip as measured within the circle having a radius of 0.2 mm.

7. A spark plug according to claim 5, wherein the intermediate tip has a linear expansion coefficient greater than that of the electrode tip.

8. A spark plug according to claim 1, satisfying a condition $$60° \leq \theta \leq 150°,$$

where, as viewed on a section which contains the center axis of the electrode tip and provides a maximum width of the fusion zone as measured along the center axis, θ is an angle between the center axis and a perpendicular bisector of a line segment connecting an upper end and a lower end of the fusion zone on a surface of the spark plug.

9. A spark plug in which a substantially columnar electrode tip is welded to a front end portion of a center electrode, and a fusion zone is formed through the welding at a boundary portion between the center electrode and the electrode tip, the spark plug satisfying a condition $$0.8 \leq A1/A2 \leq 1.9,$$

where, as viewed on a section which contains a center axis of the electrode tip, A1 [Hv] is hardness of the electrode tip as measured outside a circle having a radius of 0.2 mm, with a boundary point on a surface of the spark plug between the fusion zone and the electrode tip serving as the center of the circle, and A2 [Hv] is hardness of the electrode tip as measured within the circle having a radius of 0.2 mm.

10. A spark plug according to claim 9, satisfying a condition $$0.7 \leq B2/B1 \leq 2.3,$$

where, as viewed on the section, B1 is hardness [Hv] of the center electrode as measured outside a circle having a radius of 0.2 mm, with a boundary point on a surface of the spark plug between the fusion zone and the center electrode serving as the center of the circle, and B2 is hardness [Hv] of the center electrode as measured within the circle having a radius of 0.2 mm.

11. A spark plug according to claim 9, wherein the center electrode has a linear expansion coefficient greater than that of the electrode tip.

12. A spark plug in which a substantially columnar electrode tip is welded to a top surface of a convex intermediate tip having a flange portion at a bottom thereof to thereby form a composite tip having a fusion zone formed through the welding at a boundary portion between the intermediate tip and the electrode tip, and the composite tip is joined to a front end portion of the center electrode via the flange portion, the spark plug satisfying a condition $$0.8 \leq A1/A2 \leq 1.9,$$

where, as viewed on a section which contains a center axis of the electrode tip, A1 [Hv] is hardness of the electrode tip as measured outside a circle having a radius of 0.2 mm, with a boundary point on a surface of the spark plug between the fusion zone and the electrode tip serving as the center of the circle, and A2 [Hv] is hardness of the electrode tip as measured within the circle having a radius of 0.2 mm.

13. A spark plug according to claim 12, satisfying a condition $$0.7 \leq B2/B1 \leq 2.3,$$

where, as viewed on the section, B1 is hardness [Hv] of the center electrode as measured outside a circle having a radius of 0.2 mm, with a boundary point on a surface of the spark plug between the fusion zone and the intermediate tip serving as the center of the circle, and B2 is hardness [Hv] of the intermediate tip as measured within the circle having a radius of 0.2 mm.

14. A spark plug according to claim 12, wherein the intermediate tip has a linear expansion coefficient greater than that of the electrode tip.

15. A spark plug according to claim 9, satisfying a condition $$30° \leq \theta \leq 90°,$$

where, as viewed on a section which contains the center axis of the electrode tip and provides a maximum width of the fusion zone as measured along the center axis, θ is an angle between the center axis and a perpendicular bisector of a line segment connecting an upper end and a lower end of the fusion zone on a surface of the spark plug.

16. A spark plug according to claim 1, wherein the electrode tip has a width D measured along a direction perpendicular to the center axis of the electrode tip and satisfying a condition $$0.4 \leq D(\text{mm}) \leq 1.2.$$

17. A spark plug according to claim 1, wherein the electrode tip is a member which contains at least one of platinum, iridium, ruthenium, and rhodium.

18. A spark plug according to claim 5, satisfying a condition $$60° \leq \theta \leq 150°,$$

where, as viewed on a section which contains the center axis of the electrode tip and provides a maximum width of the fusion zone as measured along the center axis, θ is an angle between the center axis and a perpendicular bisector of a line segment connecting an upper end and a lower end of the fusion zone on a surface of the spark plug.

19. A spark plug according to claim 12, satisfying a condition $$30° \leq \theta \leq 90°,$$

where, as viewed on a section which contains the center axis of the electrode tip and provides a maximum width of the fusion zone as measured along the center axis, θ is an angle between the center axis and a perpendicular bisector of a line segment connecting an upper end and a lower end of the fusion zone on a surface of the spark plug.

20. A spark plug according to claim 5, wherein the electrode tip has a width D measured along a direction perpendicular to the center axis of the electrode tip and satisfying a condition $$0.4 \leq D(\text{mm}) \leq 1.2.$$

21. A spark plug according to claim 9, wherein the electrode tip has a width D measured along a direction perpendicular to the center axis of the electrode tip and satisfying a condition $$0.4 \leq D(\text{mm}) \leq 1.2.$$

22. A spark plug according to claim 12, wherein the electrode tip has a width D measured along a direction perpendicular to the center axis of the electrode tip and satisfying a condition $$0.4 \leq D(\text{mm}) \leq 1.2.$$

23. A spark plug according to claim 5, wherein the electrode tip is a member which contains at least one of platinum, iridium, ruthenium, and rhodium.

24. A spark plug according to claim 9, wherein the electrode tip is a member which contains at least one of platinum, iridium, ruthenium, and rhodium.

25. A spark plug according to claim 12, wherein the electrode tip is a member which contains at least one of platinum, iridium, ruthenium, and rhodium.

* * * * *